US010026163B2

(12) United States Patent
Fallgatter et al.

(10) Patent No.: US 10,026,163 B2
(45) Date of Patent: Jul. 17, 2018

(54) HYDROMETEOR IDENTIFICATION METHODS AND SYSTEMS

(71) Applicants: University of Utah Research Foundation, Salt Lake City, UT (US); FALLTECH, INC., Sandy, UT (US)

(72) Inventors: Cale Fallgatter, Sandy, UT (US); Tim Garrett, Salt Lake City, UT (US); Konstantin Shkurko, Salt Lake City, UT (US)

(73) Assignees: Cale Fallgatter, Sandy, UT (US); University of Utah Research Foundation, Salt Lake City, UT (US)

( * ) Notice: Subject to any disclaimer, the term of this patent is extended or adjusted under 35 U.S.C. 154(b) by 325 days.

(21) Appl. No.: 15/053,951

(22) Filed: Feb. 25, 2016

(65) Prior Publication Data

US 2016/0247273 A1 Aug. 25, 2016

Related U.S. Application Data (60) Provisional application No. 62/120,835, filed on Feb. 25, 2015.

(51) Int. Cl.
*G06T 7/00* (2017.01)
*G06K 9/66* (2006.01)
(Continued)

(52) U.S. Cl.
CPC ............ *G06T 7/0004* (2013.01); *G01B 11/24* (2013.01); *G06K 9/6267* (2013.01); *G06K 9/6289* (2013.01); *H04N 5/2251* (2013.01)

(58) Field of Classification Search
None
See application file for complete search history.

(56) References Cited

U.S. PATENT DOCUMENTS

| 6,061,013 A | 5/2000 | Sauvageot et al. |
| 6,377,207 B1 | 4/2002 | Solheim et al. |

(Continued)

FOREIGN PATENT DOCUMENTS

| FR | 2658617 | 8/1991 |
| JP | 2001021669 | 1/2001 |

(Continued)

OTHER PUBLICATIONS

Liu et al, Classification of Hydrometeors Based on Polarimetric Radar Measurements: Developments of Fuzzy Logic and Neuro-Fuzzy Systems, And In Situ Verification; Journal of Atmospheric and Oceanic Technology; American Meteorological Society; Feb. 1, 2000; vol. 17; pp. 140-164.

(Continued)

*Primary Examiner* — Anand S Rao
*Assistant Examiner* — Tyler B Edwards
(74) *Attorney, Agent, or Firm* — Thorpe North & Western, LLP (57) ABSTRACT

A technology is described for identifying hydrometeors. A method includes receiving an image of a hydrometeor captured using a camera. The hydrometeor in the image can be identified and analyzed to determine characteristics associated with the hydrometeor. Environmental measurements recorded substantially contemporaneously with the image can be obtained from environmental sensors located in proximity to the camera. A feature vector can be constructed using the hydrometeor characteristics and the environmental measurements. The feature vector can be input to a classification model used to classify the hydrometeor, and the classification model can output a classification for the hydrometeor using the feature vector.

20 Claims, 9 Drawing Sheets

(51) Int. Cl.
*G01W 1/02* (2006.01)
*H04N 5/33* (2006.01)
*G01B 11/24* (2006.01)
*G06K 9/62* (2006.01)
*H04N 5/225* (2006.01)

(56) References Cited

U.S. PATENT DOCUMENTS

| | | | |
|---|---|---|---|
| 7,158,071 B2 | 1/2007 | Testud et al. | |
| 7,414,706 B2 | 8/2008 | Nichols et al. | |
| 8,891,895 B2 | 11/2014 | Garrett et al. | |
| 8,984,939 B1 | 3/2015 | Eilts et al. | |
| 2013/0051696 A1* | 2/2013 | Garrett | G01B 11/245 382/254 |
| 2013/0057687 A1* | 3/2013 | Ehlgen | G01N 21/538 348/148 |
| 2013/0332115 A1 | 12/2013 | Pratt et al. | |
| 2015/0109146 A1 | 4/2015 | Drobot et al. | |
| 2015/0145717 A1* | 5/2015 | Lim | G01S 7/025 342/26 R |
| 2016/0011335 A1 | 1/2016 | Sasaki | |

FOREIGN PATENT DOCUMENTS

| | | |
|---|---|---|
| KR | 10083818 | 6/2008 |
| KR | 20150059864 | 6/2013 |
| WO | WO2006/067513 | 6/2006 |
| WO | WO2015/167914 | 11/2015 |

OTHER PUBLICATIONS

Loffler-Mang, An Optical Disdrometer for Measuring Size and Velocity of Hydrometeors; Journal of Atmospheric and Oceanic Technology; American Meteorological Society; Feb. 1, 2000; vol. 17; pp. 130-139.

Marzano et al, Supervised Classification and Estimation of Hydrometeors From C-Band Dual-Polarized Radars: A Bayesian Approach; Transactions on Geoscience and Remote Sensing; IEEE; Jan. 2008; vol. 46 Issue 1; pp. 85-98.

Straka et al, Bulk Hydrometeor Classification and Quantification Using Polarimetric Radar Data: Synthesis of Relations; Journal of Applied Meteorology; American Meteorological Society; Aug. 1, 2000; vol. 39; pp. 1341-1372.

Bernauer et al, Snow Event Classification With a 2D Video Disdrometer—A decision Tree Approach; Atmospheric Research; Elsevier;May 15-Jun. 1, 2016; vols. 172-173, pp. 186-195.

Garrett et al, Fall Speed Measurement and High-Resolution Multi-Angle Photography of Hydrometeors in Free Fall; Atmospheric Measurement Techniques; Copernicus Publications on behalf of the European Geosciences Union; Nov. 5, 2012; vol. 5 Issue 11; pp. 2625-2633.

Campbell Scientific, PWS100 Present Weather Sensor; http://www.campbellsci.com/pws100; Date Accessed Sep. 22, 2016.

Vaisala, Present Weather Sensors; http://www.vaisala.com/en/products/presentweathersensors/Pages/default.aspx; 2 Pages; Date accessed Sep. 22, 2016.

* cited by examiner

HYDROMETEOR IDENTIFICATION METHODS AND SYSTEMS

RELATED APPLICATION

This application claims priority to U.S. Provisional Application No. 62/120,835, filed Feb. 25, 2015 which is incorporated herein by reference.

GOVERNMENT INTEREST

This invention was made with government support under grant 10034297 awarded by the National Science Foundation (NSF). The government has certain rights in the invention.

BACKGROUND

Accurate characterization of the physical properties of atmospheric hydrometeors is useful for a broad range of practical and scientific applications. For example, hydrometeor diameter, mass, and fall-speed relationships are useful components of weather and climate numerical models used in forecasting. The range of possible particle shapes and sizes is extremely broad, and includes raindrops, dendritic snowflakes, aggregated forms, graupel, hail, etc. with numerous potential variations, and generally includes sizes ranging in diameters from less than a millimeter to several centimeters.

A wide variety of electro-optical and communications devices and methods have been developed for inspecting and analyzing hydrometeors. Such systems have attempted to characterize hydrometeor structures and relate crystalline forms to changes in atmospheric electromagnetic attenuation, fall velocity, density, etc. These systems often utilize lasers, shadows and diffraction patterns to classify hydrometeors. Further, viewing of hydrometeors generally may take place in the field. However, such devices configured for viewing hydrometeors in the field have often involved significant manual intervention and have been unpredictable and/or unreliable, especially at temperatures near freezing. In addition, past devices have not provided sufficient visualization of the more minute features of hydrometeors, such as the crystalline structure of snowflakes or ice, in a continuous fashion or in an accurate manner.

The ability to accurately and dependably study various particles in the field, including hydrometeors, can be useful in a variety of applications. For example, departments of transportation may use information developed from the analysis of hydrometeors to better respond to weather conditions that may be affecting public roads. Being able to document and image hydrometeors and properties of the hydrometeors, particularly at close range, is potentially useful for a wide variety of applications. For example, improvements in systems can be useful for documenting and imaging hydrometeors, as well as for providing information on the oscillation of hydrometeors, the conditions at which the hydrometeors tumble, the specific type of crystals that traverse a point along a line of sight, and the relationship between fall speed and particle size, color data, volume data, fall speed, and trajectory.

SUMMARY

A computer implemented method can include receiving an image of a hydrometeor captured using a camera and identifying the hydrometeor in the image, using a processor. The method can also include analyzing the hydrometeor represented in the image to determine characteristics associated with the hydrometeor, using the processor. The method can further include obtaining environmental measurements from environmental sensors located in proximity to the camera and recorded substantially contemporaneously with the image, using the processor. This method can also include constructing a feature vector using the hydrometeor characteristics and the environmental measurements, using the processor; and inputting the feature vector to a classification model used to classify the hydrometeor, using the processor, where the classification model outputs a classification for the hydrometeor using the feature vector.

A complimentary hydrometeor identification system can include a motion sensor controller, a camera activation module, an environmental measurement module, and a hydrometeor classification module. The motion sensor controller is configured to control a motion sensor and to generate a camera activation signal when the motion sensor senses motion. The camera activation module is placed in communication with the motion sensor controller, while the camera activation module is configured to receive the camera activation signal and activate a camera to capture an image of a hydrometeor. The environmental measurement module is also configured to obtain environmental measurements from a plurality of environmental sensors that are located in proximity to the camera and are recorded substantially contemporaneous with the image of the hydrometeor using the camera. The hydrometeor classification module is configured to output a classification for the hydrometeor using a classification model, where a feature vector is constructed using hydrometeor characteristics obtained from the image of the hydrometeor and the environmental measurements obtained from the environmental measurement module is inputted to the classification model.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

DETAILED DESCRIPTION

Reference will now be made to the exemplary embodiments illustrated, and specific language will be used herein to describe the same. It will nevertheless be understood that no limitation of the scope of the invention is thereby intended. Additional features and advantages of the invention will be apparent from the detailed description which follows, taken in conjunction with the accompanying drawings, which together illustrate, by way of example, features of the invention.

In describing and claiming the present invention, the following terminology will be used in accordance with the definitions set forth below.

As used herein, "electrically coupled" refers to a relationship between structures that allows electrical current to flow at least partially between them. This definition is intended to include aspects where the structures are in physical contact and those aspects where the structures are not in physical contact. Typically, two materials which are electrically coupled can have an electrical potential or actual current between the two materials. For example, two plates physically connected together by a resistor are in physical contact, and thus allow electrical current to flow between them. Conversely, two plates separated by a dielectric material are not in physical contact, but, when connected to an alternating current source, allow electrical current to flow between them by capacitive current. Moreover, depending on the insulative nature of the dielectric material, electrons may be allowed to bore through, or jump across the dielectric material when enough energy is applied.

As used herein, "optically coupled" refers to a relationship between structures that allows beams of light to flow at least partially between them. This definition is intended to include aspects where the structures are in physical contact and those aspects where the structures are not in physical contact.

As used herein, "adjacent" refers to near or close sufficient to achieve a desired result. Although direct physical contact is most common and preferred in the structures or volumes of the present invention, adjacent can broadly allow for spaced apart features.

As used herein, the term "substantially" refers to the complete or nearly complete extent or degree of an action, characteristic, property, state, structure, item, or result. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect on the property of interest thereof.

As used herein, the term "about" is used to provide flexibility to a numerical range endpoint by providing that a given value may be "a little above" or "a little below" the endpoint with a degree of flexibility as would be generally recognized by those skilled in the art. Further, the term about explicitly includes the exact endpoint, unless specifically stated otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of" For example, "at least one of A, B and C" explicitly includes only A, only B, only C, and combinations of each.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation can apply regardless of the breadth of the range or the characteristics being described.

Hydrometeors can be analyzed by documenting and imaging the hydrometeors and identifying various characteristics associated with the hydrometeors. For example, information based upon oscillation of hydrometeors, conditions at which hydrometeors tumble, specific types of crystals that transverse a point along a line of sight, relationships between fall speed and particle size, color data, volume data, fall speed, trajectory, etc. can be used to analyze hydrometeors. Prior systems and methods utilized in imaging and obtaining data about falling objects have been limited in ability to accurately and adequately image and obtain such data about falling objects. For example, prior systems have included low resolution imagers that produce images having insufficient resolution to adequately extract physical information for a falling object that can be used to classify the falling object. Such prior systems have been costly, difficult to maintain, susceptible to weather elements, and have had issues with accuracy and reliability.

A technology is described for imaging characteristics of hydrometeors, such as snowflakes, raindrops, hail, and other forms of precipitation and identifying the hydrometeors using the imaged characteristics based on classification. The systems and methods described herein can be used for imaging hydrometeors of various types, sizes, shapes, and so forth. In a specific example, the hydrometeors may have a diameter in the range of less than a millimeter to many centimeters.

Figure 1:
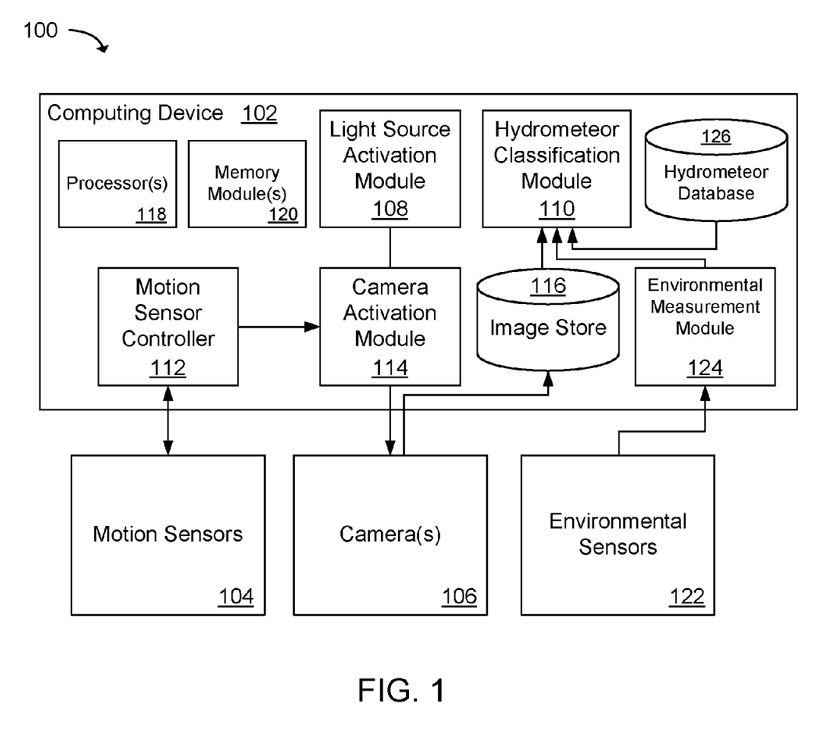
FIG. 1 is a block diagram illustrating various example components included in a system for capturing an image of a hydrometeor and classifying the hydrometeor.

FIG. 1 illustrates components of an example system 100 on which the present technology may be executed. The system 100 may be configured to manage the operation of a hydrometeor classification device. The system 100 may include a computing device 102 that may be in communication with one or more cameras 106, motion sensors 104 and environmental sensors 122. The computing device 102 may contain a number of modules used in classifying hydrometeors. In one example configuration, the computing device 102 may include a motion sensor controller 112, a camera activation module 114, a light source activation module 108, and a hydrometeor classification module 110.

A motion sensor controller 112, which can be included in circuitry, may be used to control a plurality of motion sensors 104 and to generate a camera activation signal when the plurality of motion sensors 104 sense motion. The system 100 can include a camera activation module 114, which may also be included in circuitry. The camera activation module 114 may be in communication with the motion sensor controller 112. The camera activation module 114 may receive the camera activation signal and activate the camera 106 to capture one or more images of a hydrometeor.

The camera 106 can be configured to capture high resolution images of hydrometeors within a predetermined location of the camera's field of view. The predetermined location may be defined using motion sensors 104 that sense a presence of the hydrometeor within the predetermined location and send a camera activation signal to the camera 106. Thus, the predetermined location within the camera's field of view allows for a high resolution image of a hydrometeor to be captured, thereby enabling physical information for the hydrometeor to be extracted from the high resolution image and a size of the hydrometeor to be calculated based in part on the distance of the predetermined location from the camera as defined by the placement of the camera 106 and the placement of the motion sensors 104 in the hydrometeor classification device. Although high resolution can vary, typically a suitable camera resolution can range from about 10 µm to about 100 µm and in some cases 1 MP to about 10 MP, and often VGA to 12 MP.

A light source activation module 108, which may also be included in circuitry, may be in communication with the motion sensor controller 112 and the camera activation module 114. The light source activation module 108 may receive the camera activation signal. In response to receiving the camera activation signal, the light source activation module 108 can activate a flashing light source to provide a flash of light in synchronization with image capture by the camera 106 to illuminate the hydrometeor when an image of the hydrometeor is captured. The image may be stored to an image store 116 after being captured.

The system 100 may include environmental sensors 122 that can provide environmental measurements used in classifying hydrometeors. An environmental measurement module 124 may be configured to obtain environmental measurements from the environmental sensors 122 that are located in proximity to the camera 106 and are recorded substantially contemporaneous with an image of a hydrometeor using the camera 106. The environmental sensors 122 may include, but are not limited to, a cloud height indicator sensor, visibility sensor, precipitation identification sensor, freezing rain sensor, lightening sensor, pressure sensor, ambient/dew point temperature sensor, anemometer, and precipitation accumulation sensor. Environmental measurements recorded using the environmental sensors 122 may be stored to a data store (not shown) or may be recorded substantially contemporaneously with an image capture of a hydrometeor as described above.

The system 100 may also include a hydrometeor classification module 110 that can be used to determine a classification for a hydrometeor captured in an image by the camera 106. In one example configuration, a machine learning model can be used to classify hydrometeors captured in an image using the camera 106. A feature vector can be constructed using hydrometeor characteristics obtained from an image of a hydrometeor. In some examples, environmental measurements obtained by the environmental measurement model 124 from the various environmental sensors 122 can be included in the feature vector. The feature vector can then be inputted to the machine learning model, which can classify the hydrometeor based on the features included in the feature vector. A hydrometeor database 126 accessible to the hydrometeor classification module 110 can include hydrometeor data that can be used in classifying a hydrometeor. Although machine learning models can be very useful, other models can also be used. Suitable classification models can include fuzzy logic models, and the like. In one example, fuzzy logic can be used to augment classification based on machine learning models.

The various modules described above can be in the form of hardware, firmware, software, and/or combinations thereof. The modules can be formed in circuitry or can utilize the circuitry to perform various operations, or can be located externally from the housing of the hydrometeor classification device, such as in an electronically connected computing system. The modules can be in communication with a processor 118 for performing various operations. The various processes and/or other functionality contained within the computing device 102 may be executed on the one or more processors 118 that are in communication with one or more memory modules 120. In one example, one or more of the modules comprises computer readable code, stored on a non-transitory computer readable storage medium, which when executed by the processor 118 causes a system to perform the described operations.

As illustrated, the computing device 102 can be a single computing device. However, one or more modules can optionally be provided by a single computing device or multiple computing devices which are parallelized or otherwise cooperatively communicate. The computing device can receive captured or stored images from the camera 106. The computing device can optionally store the received images on an image store 116, such as a hard drive, optical disc, flash memory, and the like. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

Figure 2:
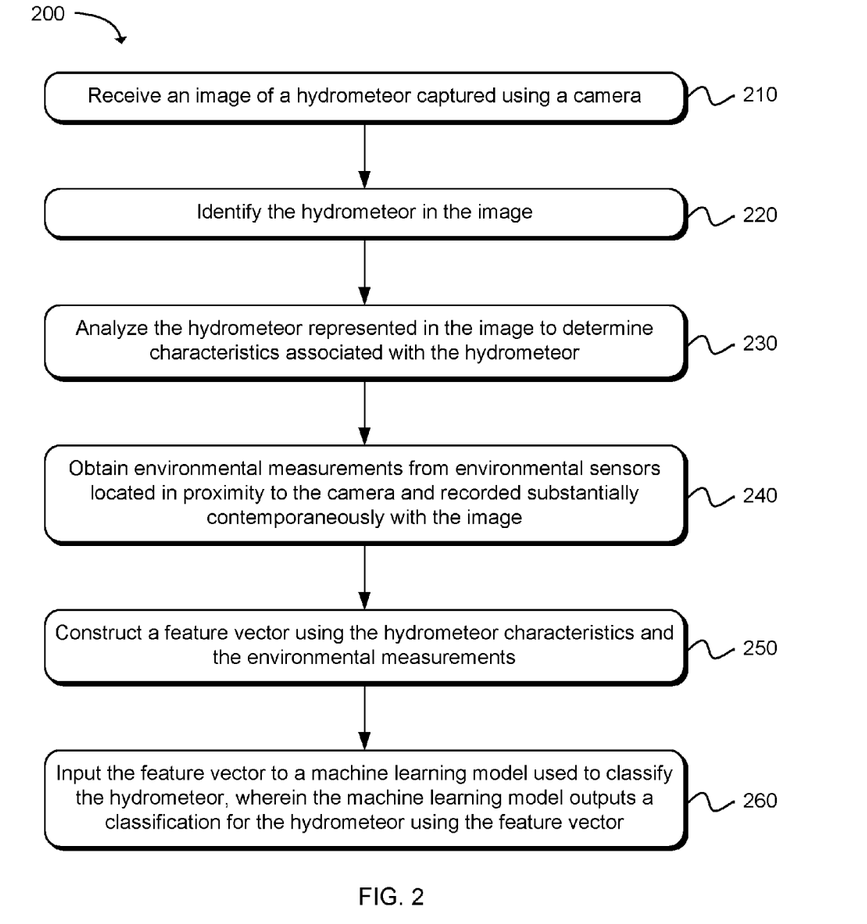
FIG. 2 is a flow diagram that illustrates an example method for classifying a hydrometeor.

Moving now to FIG. 2, a flow diagram illustrates an example method 200 for classifying a hydrometeor captured in an image using a camera. Starting in block 210, an image of a hydrometeor captured using the camera may be received. The image of the hydrometeor may be captured after determining a presence of the hydrometeor at a predetermined location that results in activating the camera. For example, motion sensors may be used to detect a presence of a hydrometeor within a field of view of the camera, allowing for a high resolution image of the hydrometeor to be captured. More specifically, because a hydrometeor is located within the field of view of the camera when the image is captured, the image of the hydrometeor includes sufficient resolution to extract physical information for the hydrometeor from the image that can be used by a classifier to identify the hydrometeor. Further, capturing an image of a hydrometeor within the predetermined location of the camera's field of view allows for a size of the hydrometeor to be determined based in part on the distance of the camera to the predetermined location.

Motion sensors can be based on IR, visible, laser, other suitable light source, changes in electric or magnetic field, and the like. As one specific example, four infrared (IR) emitters and four IR detectors can be used to detect the presence of hydrometeors within a camera field of view. The IR sensor pairs (i.e., the IR emitters and IR detectors) can be placed to form two detection regions, a top detection region and a bottom detection region, where two IR sensor pairs make up each detection region. The IR sensor pairs may be arranged so that the beams emitted from the IR sensors cross, creating a triggering area. In the event that the top detection region senses a hydrometeor, a timer is started. If the lower detection region detects the hydrometeor, the timer is stopped and the camera is instructed to take one or more pictures. A determination may then be made how fast the hydrometeor fell using the timer and the distance between the two detection regions. The image(s) can then be stored for later processing/archiving and/or processed, as in block 220, to identify the hydrometeor in the image.

In one example, identifying the hydrometeor in the image may include steps that result in separating image pixels representing the hydrometeor from surrounding image pixels. In one example, a threshold may be determined for the image using a thresholding technique, contours of the hydrometeor may then be detected in the image using an edge detection technique that uses the threshold for the image, and the contours of the hydrometeor that are in focus in the image may be identified.

As an illustration, a threshold can be determined using an Otsu thresholding method. Otsu's threshold method separates foreground pixels from background pixels by minimizing intra-class variance of the foreground and background in an image. The threshold obtained using Otsu thresholding can be used as an input to a Canny Edge Detector method used to identify contours in the image. Contours identified may then be analyzed to determine the contours' inter-pixel brightness variability and a threshold may be used to identify those contours that are in focus. In cases where multiple regions of interest in an image are in focus (e.g., multiple hydrometeors), regions of the image having inter-pixel brightness variability that is greater than the threshold for the image may be analyzed to identify the contours of the hydrometeor(s) that are in focus.

After identifying the hydrometeor in the image, as in block 230, the hydrometeor represented in the image may be analyzed to determine characteristics associated with the hydrometeor. For example, hydrometeor characteristics may include hydrometeor shape, hydrometeor size, hydrometeor fall speed, hydrometeor brightness, hydrometeor internal variability, and hydrometeor mass. In one example, FFT (fast Fourier transform) spectrum analysis can be used to analyze a hydrometeor and determine hydrometeor characteristics. The hydrometeor characteristics may be used to construct a feature vector. The feature vector may represent the hydrometeor and may be used as input to a machine learning model used to classify the hydrometeor.

In addition to determining hydrometeor characteristics, as in block 240, environmental measurements may be obtained from environmental sensors located in proximity to the camera and recorded substantially contemporaneously with the image. The environmental measurements may be included in the feature vector that represents the hydrometeor. Examples of environmental measurements that can be obtained from the environmental sensors may include, but are not limited to: environmental temperature, environmental relative humidity, environmental dew point temperature, wind direction, atmospheric pressure, and precipitation accumulation.

As in block 250, a feature vector may then be constructed using the hydrometeor characteristics and the environmental measurements. Resulting features that can be included in the feature vector may include, but are not limited to: mean intensity of the hydrometeor, variance of the hydrometeor, inter-pixel brightness variability, perimeter of the hydrometeor, slope of an azimuthally averaged power spectrum of the hydrometeor, fall speed of the hydrometeor, number of separate regions in the image that are in focus, environmental relative humidity, environmental temperature, internal variability, FFT spectrum, as well as other features. Feature data may include text files, a compressed (binary) data stream, raw data or combinations thereof.

As in block 260, the feature vector may then be inputted to a machine learning model used to classify the hydrometeor. The machine learning model may be configured to output a classification for the hydrometeor using the feature vector. Examples of classifications that may be output include drizzle, rain, freezing rain, freezing drizzle, freezing fog, freezing rain, ice crystals, hail graupel, snow, snow grains, ice pellets, snow pellets, blowing snow, mixed precipitation, and the like. Contributions by dust (e.g. volcanic ash) can also be used. Examples of machine learning models that may be used to classify a hydrometeor may include supervised and unsupervised machine learning models such as, a Bayesian model, a random forests model, an ensemble classifier model, a logistic regression model, a naive Bayes classifier, a stochastic gradient descent model, a support vector machine model, as well as other types of machine learning models not specifically mentioned here.

In addition to classifying hydrometeors, visibility may be determined using a contrasting black and white image captured with near-infrared light using the camera. For example, the contrasting black and white image may be analyzed to determine a presence of fog or haze. The visibility of air may be defined as the attenuation of the contrast in distant objects. In atmospheric applications, there can be several sources for the reduction of visibility at the ground. One may be atmospheric cloud droplets, or fog, another may be atmospheric precipitation, while dust and solid particulates can also contribute to reduced visibility. Optionally, visibility corrections can be made using precipitation sensor measurements such as hydrometeor particle size and concentration.

To assess the visibility reduction due to fog and precipitation, an image of a contrasting black and white background may be captured at regular intervals and with varying flash intensity. In the case of no fogginess, the contrast between the two backgrounds may be high. For extremely high fogginess, the contrast may diminish to zero. The relationship between fogginess and contrast may be determined using radiative transfer calculations and field tests. For example, a range of flash lengths can be used to enable detection of visibilities ranging from <¼ statute miles to 10+ statute miles, in accordance with Automated Surface Observing System (ASOS) standards for Aviation Routine Weather Report (METAR) reports. Greater flash lengths enable detection of progressively lighter visibility reductions.

In another example, visibility may be determined using a black background in an image captured using the camera. For example, a black or other high contrast color can be presented on surfaces opposite the hydrometeor from the camera. Such contrast can improve image recognition processing.

FIGS. 3a-e illustrate an example hydrometeor classification device 300 in accordance with one embodiment of the present technology. A plurality of motion sensors 302 can be arranged at a first plurality of angles around a void 304 (i.e. a hydrometeor detection region). The motion sensors 302 can have a common sensing point near the center of the void 304. The motion sensors 302 can each include an emitter and a detector. The detector can be positioned across the void 304 from the emitter. For example, the detector and emitter can be attached on opposite sides of the void 304 and be aligned such that a signal from the emitter is detected by the detector. The number of emitters and detectors can be varied according to a particular application. The emitter can be configured to emit electromagnetic energy (such as radio, microwave, or light rays) or optionally ultrasound in the direction of the detector. The detector can be configured to receive the emitted waves or rays. In one aspect, the waves or rays can be intermittent bursts of energy or light rather than a continual emission of energy or light.

Figure 3A:
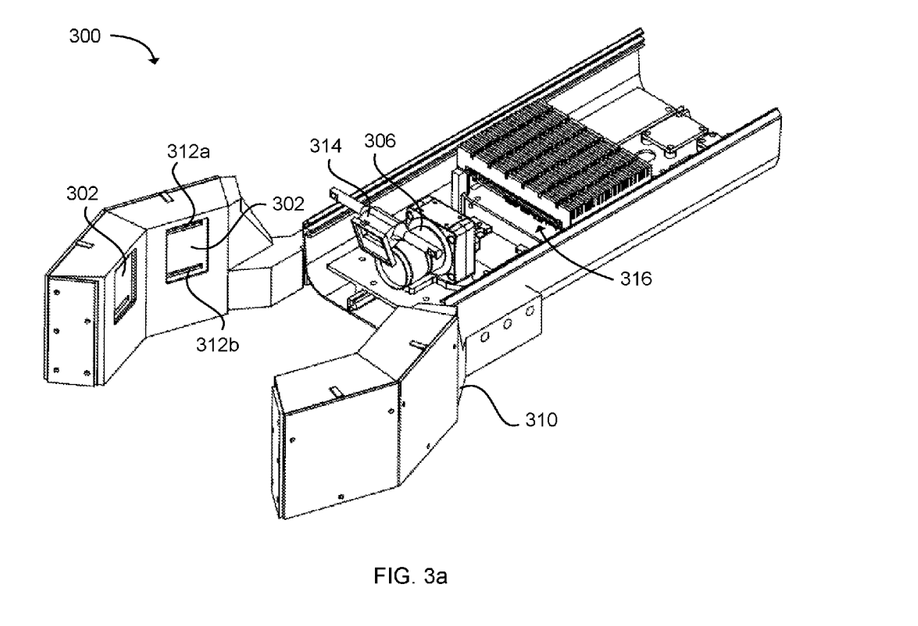
FIGS. 3a-e are various views of an example hydrometeor classification device configuration.
Figure 3B:
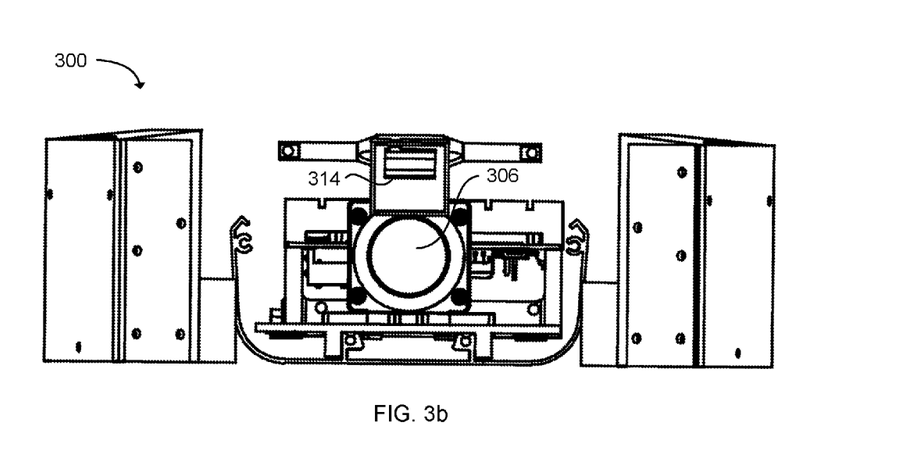
Figure 3C:
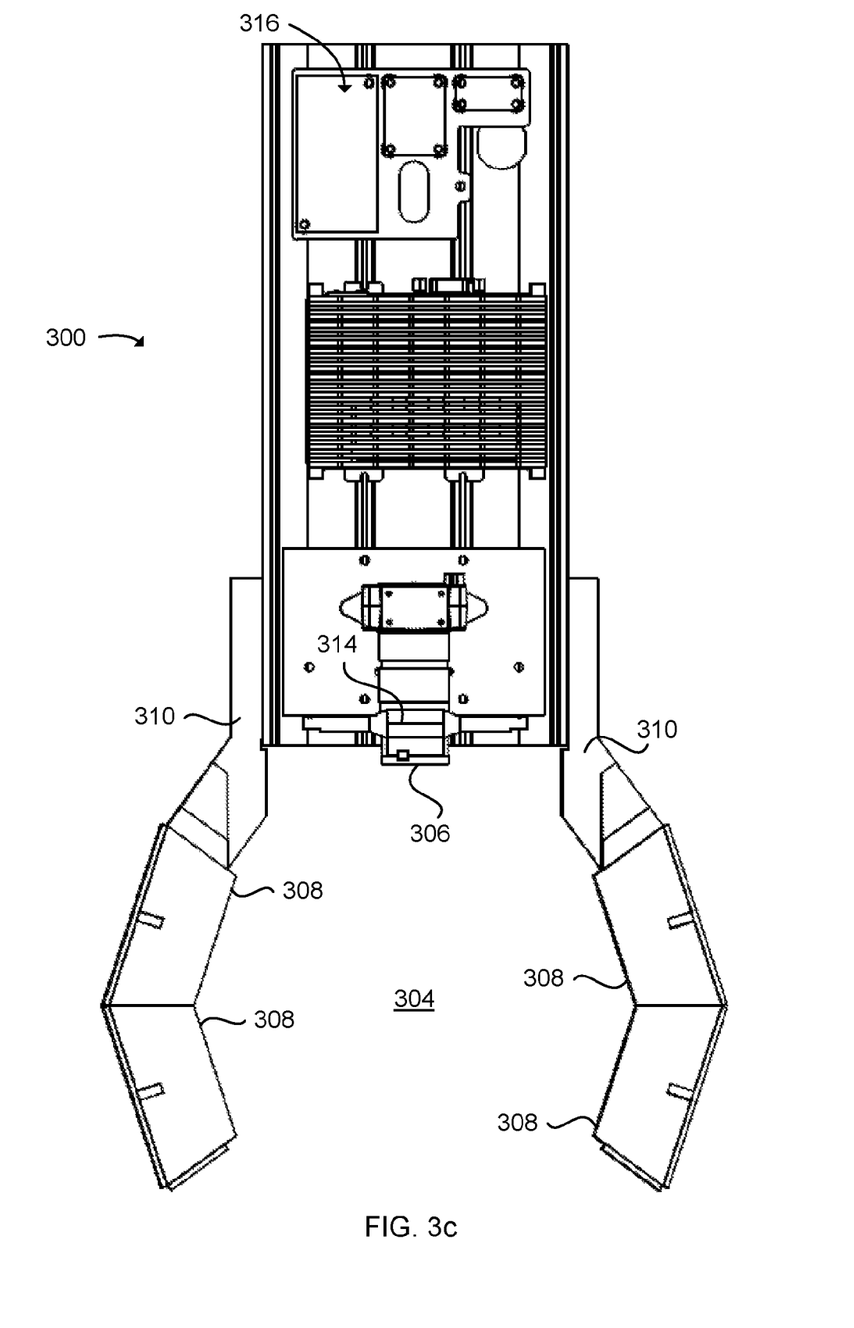
Figure 3D:
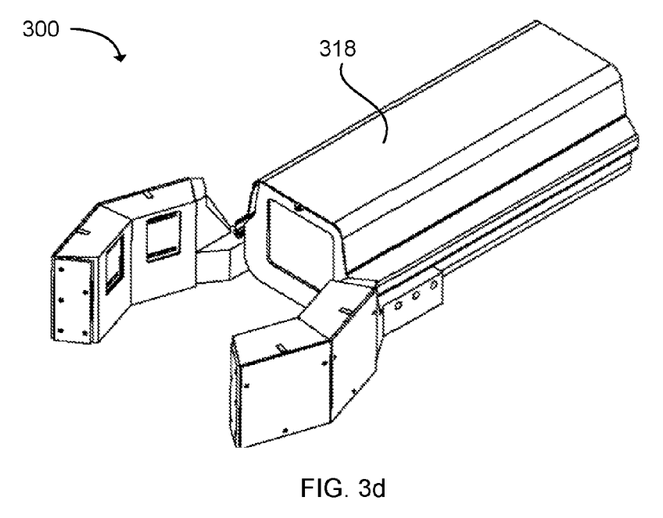
Figure 3E:
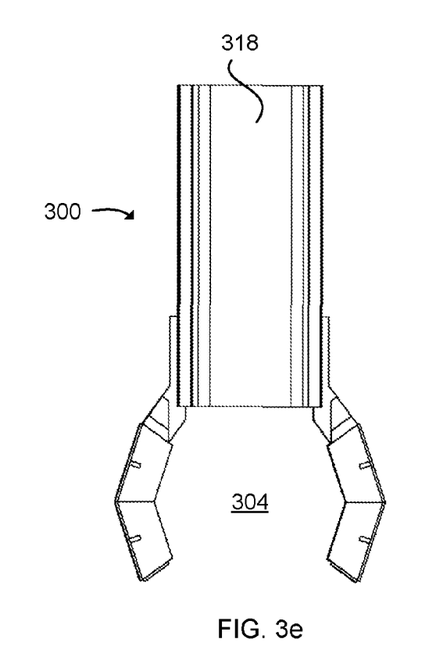

The hydrometeor classification device 300 can include one or more cameras 306. The hydrometeor classification device 300 can include any desired number of cameras 306. In some examples, a second camera can be added to take stereo images. In other examples, camera filters may be used to capture images using visible or nonvisible light. The hydrometeor classification device 300 can include a frame 310 having a plurality of walls 308 defining the void 304. In another example, a single wall, such as a circular or curved wall can define the void. In the example using multiple walls 308, the walls 308 can form a polygonal cross-sectional shape (as illustrated in FIG. 3c).

A camera 306 may be configured to capture images of a hydrometeor when the motion sensors 302 detect motion within the void 304. However, in some cases, multiple cameras can be used to increase accuracy and available information. For example, from two to eight cameras can be oriented at varying perimeter angles. In one example, a pair of infrared light emitters and a pair of corresponding infrared light detectors may be used to detect hydrometeors that fall within a field of view of the camera 306. In another example, a pair of infrared laser diode emitters and a pair of corresponding infrared laser detectors may be used to detect hydrometeors that fall within a field of view of the camera 306. In another example, the system may be configured to receive a camera activation signal as a result of a hydrometeor passing through a detection region that includes an upper trigger area and a lower trigger area formed using motion sensor arrays, wherein triggering the upper trigger area starts a timer and triggering the lower trigger area stops the timer and causes a camera activation signal to be sent to the camera 306.

The hydrometeor classification device 300 can also include a light source 314. The light source 314 may provide natural or artificial light. In one example, the light source 314 comprises a flashing artificial light source, such as infrared light (IR) emitters, IR laser diode emitters, Light Emitting Diodes (LEDs), Xenon Flash, Air gap spark, or the like. The light source 314 provides light to illuminate a hydrometeor during image capture. A flashing light source can be configured to illuminate the hydrometeor when images of the hydrometeor are captured with the camera 306. The flashing light source can be configured to provide a flash of light in synchronization with image capture by the camera 306. In other words, when the motion sensors 302 have detected motion, the camera 306 and the flashing light source can be activated to capture an image and provide light flashes substantially simultaneously. For example, the camera 306 and flashing light source can operate substantially immediately after motion is detected or may wait a predetermined time period after motion detection to begin operation. The camera 306 and the flashing light source can operate substantially simultaneously or successively. The system can include a switch for switching between simultaneous and successive activation of the camera 306/light source 314. Providing a flash of light when the images are captured can enable capture of clearer images of a falling object. In one aspect, the flash of light can have a very brief duration, such as a duration of a few milliseconds or microseconds, in some cases 1 µsec to 10 msec, and in some cases from about 10 µsec to 5 msec. The flashing light can be configured to provide a single flash of light or to provide successive flashes of light at predetermined intervals.

A flashing light source can provide brief flashes of light which do not adversely affect falling objects, such as snowflakes. Continuous light sources can heat up the hydrometeor classification device 300, the void 304, and/or the falling object and may affect the falling object. For example, a crystalline structure of a snowflake may be altered or destroyed by heat from a continuous light source. A brief flash of light can have little or no impact on temperature and can be bright enough to provide good illumination of crystalline structure of snowflakes. In one aspect, the flash of light and activation of the camera 306 can provide a $\frac{1}{100,000}$th of a second exposure time. Because many falling objects have very small and intricate structures, the exposure time can be very short to get an acceptable resolution at the level of a few microns without image blurring. In one alternative, an IR filter can be oriented adjacent the light source 314 in order to remove visible light. In this manner, visible light flashes can be eliminated to avoid distraction of nearby drivers, pedestrians, animals, or others.

The hydrometeor classification device 300 can be configured to determine fall speed of the falling object based on successive flashes of light. In another example, the system can include multiple sets of motion sensors 302 at different heights around the void. The camera 306 can be activated to capture an image when the falling object passes a first set of motion sensors 312a at a first height and can be subsequently activated again when the falling object passes a second set of motion sensors 312b at a second height. The time delay between when the images are captured can be used to determine the fall speed of the falling object. A series of motion sensors 302 can be used to obtain a series fall speed measurements for a falling object, and the fall speed measurements can then be used to calculate an acceleration or deceleration of a falling object.

In another example, the system can provide successive flashes of light to capture multiple images per frame while capturing images when the falling object is at different heights within the void 304. The multiple images per frame can be used to study the rotation of the falling object and to verify the velocity captured using the multiple sets of motion sensors 302. In yet another example, a shutter speed of the camera 306 can be decreased so as to cause images to blur during image capture. The resulting blur has a length which can be used to calculate fall speed by dividing the blur length by shutter speed.

The hydrometeor classification device 300 can include a power source or power supply for supplying electrical power to circuitry, the camera 306, the motion detectors 302, and so forth. The power source can include a battery for powering the hydrometeor classification device 300 when an external power source is not available. In another example where an external power source is available, the power source can operate to convert an Alternating Current (AC) signal coming from the external power source into a usable Direct Current (DC) signal by stepping down the input voltage level with a transformer and then rectifying the signal to convert to DC. Once the DC signal is generated, the DC signal can be used to power all the various components of the hydrometeor classification device 300.

The hydrometeor classification device 300 can include a housing 318. The housing 318 can be configured to enclose computing components 316, the motion sensors 302, the camera 306, and the light source 314 so as to at least partially prevent weather damage to components within the housing 318, and further configured to allow a hydrometeor to enter the void 304. For example, the housing 318 can be waterproof to prevent moisture from reaching the electronic components inside the housing 318. The void 304 can be formed in the housing 318. In one example, the hydrometeor classification device 300 can include an aerodynamic housing that can rotate via passive or active control (wind vane or motors). The hydrometeor classification device 300 could rotate in 2D similar to a wind vane or on a 3D gimbal to allow alignment with the wind.

Figure 4A:
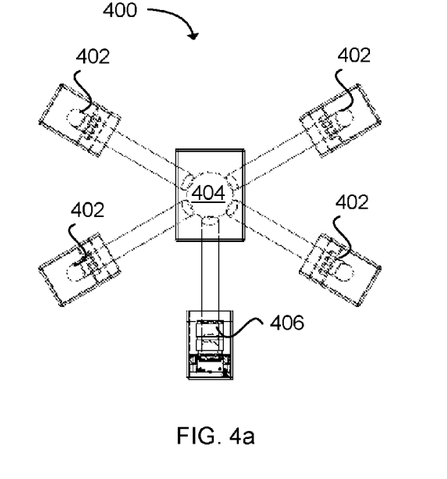
FIGS. 4a-c are various views of another example hydrometeor classification device configuration that includes multiple housings for components included in the hydrometeor classification device.
Figure 4B:
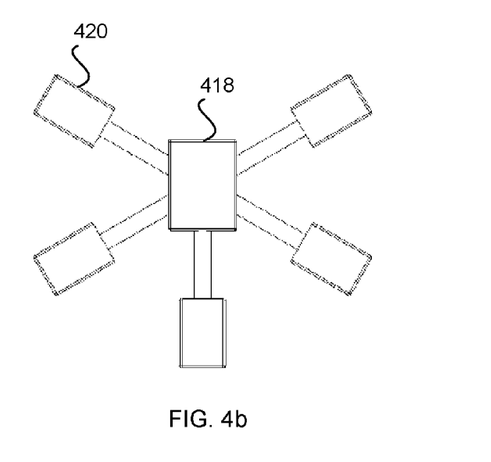
Figure 4C:
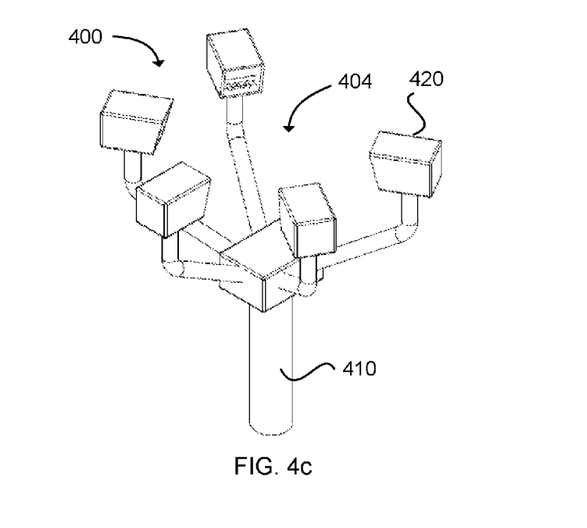

FIGS. 4a-c illustrate an example hydrometeor classification device configuration in accordance with another embodiment of the present technology. As illustrated, a hydrometeor classification device 400 can be configured to include separate housings 420 for motion detectors 402 and a camera 406. The separate housings 420 can be attached to a central housing 418 containing enclosed computing components used to identify hydrometeors. The separate housings 420 can be arranged at angles around a void 404 defining a hydrometeor detection region. The motion detectors 402 and the camera 406 contained in the separate housings 420 may be communicatively attached to the computing components contained in the central housing 418. The central housing 418 may be fixed to a central support 410, allowing the hydrometeor classification device 400 to be placed in an elevated position.

Figure 5A:
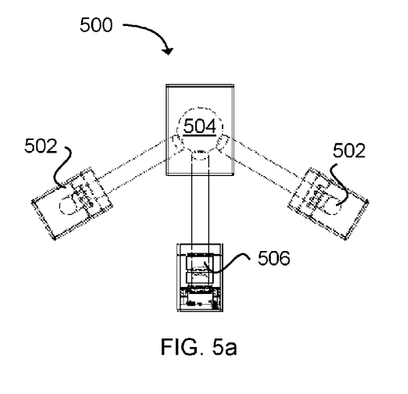
FIGS. 5a-c are various views of an example hydrometeor classification device configured with infrared (IR) emitters and IR detectors.
Figure 5B:
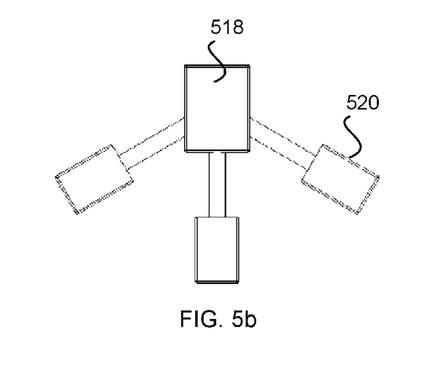
Figure 5C:
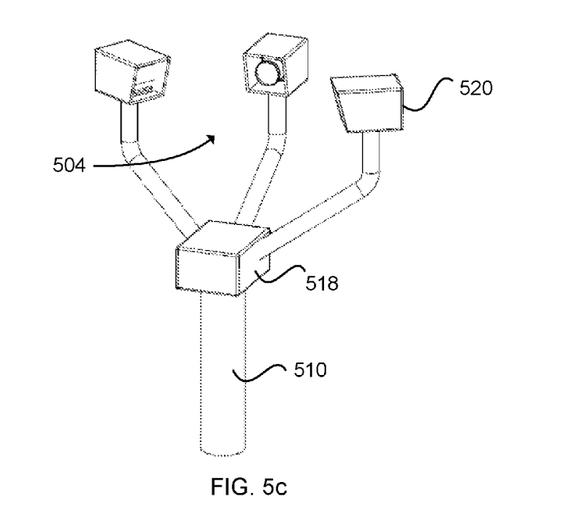

FIGS. 5a-c illustrate another example of a hydrometeor classification device 500 in accordance with another embodiment of the present technology. The hydrometeor classification device 500 can be configured with reflective IR emitters/detectors 502 and a camera 506. The IR emitter's LEDs emit IR light and when a hydrometeor is present in a void 504 defining a hydrometeor detection region, the IR light is reflected back to the IR detectors 502 (a photo diode receiver) and the camera 506 is activated. An image of the hydrometeor captured by the camera 506 can then be classified as described earlier.

As illustrated, the hydrometeor classification device 500 can be configured to include separate housings 520 for the IR emitters/detectors 502 and the camera 506. The separate housings 520 can be attached to a central housing 518 containing enclosed computing components used to identify hydrometeors. The housings 520 can be connected to the central housing via support arms which provide mechanical support and can act as a conduit for power and data cables which operatively connect the camera 506, IR emitters/detectors with the computing and/or storage components. The separate housings 520 can be arranged at angles around the void 504 defining the hydrometeor detection region. The IR emitters/detectors 502 and the camera 506 can be communicatively attached to the computing components contained in the central housing 518. The central housing 518 and the attached separate housings 520 can be placed in an elevated position using a central support 510 attached to the central housing 518.

Figure 6A:
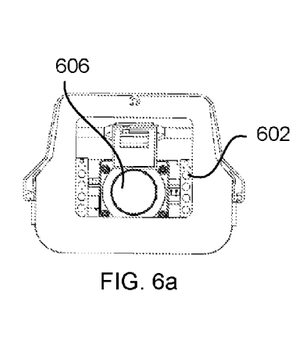
FIGS. 6a-b illustrate two views of an example hydrometeor classification device having components used to detect and image a hydrometeor within a single housing.
Figure 6B:
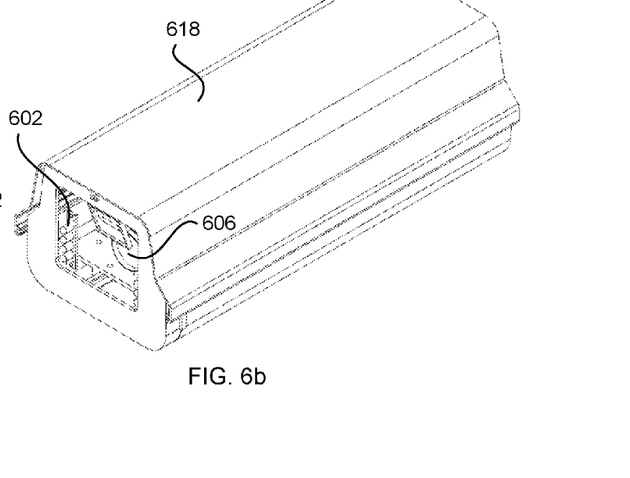

FIG. 6a-b illustrate another example of a hydrometeor classification device 600 that includes IR emitter/detectors 602 oriented inside of a housing 618 that can include a camera 606 and computing components used to classify a hydrometeor in an image captured by the camera 606. The IR emitters 602 may use LEDs to emit IR light and when a hydrometeor is present within a hydrometeor detection region, the IR light is reflected back to the IR detector 602 and the camera 606 is activated, resulting in capturing an image of the hydrometeor.

In an alternative example, the camera 606 of the hydrometeor classification device 600 can be configured to operate in video mode and may be configured to capture an image of a hydrometeor when the hydrometeor is in view of the camera 606. In one example, the IR emitter/detectors 602 may be used in detecting a hydrometeor that is in view of the camera 606 while operating in video mode. In another example that does not include the IR emitter/detectors 602, the camera 606 may be a high frame rate camera that continuously operates in video mode and uses machine learning to determine when a hydrometeor is focused in view of the camera 606, whereupon an image of the hydrometeor is saved to computer memory and used to classify the hydrometeor.

Figure 7:
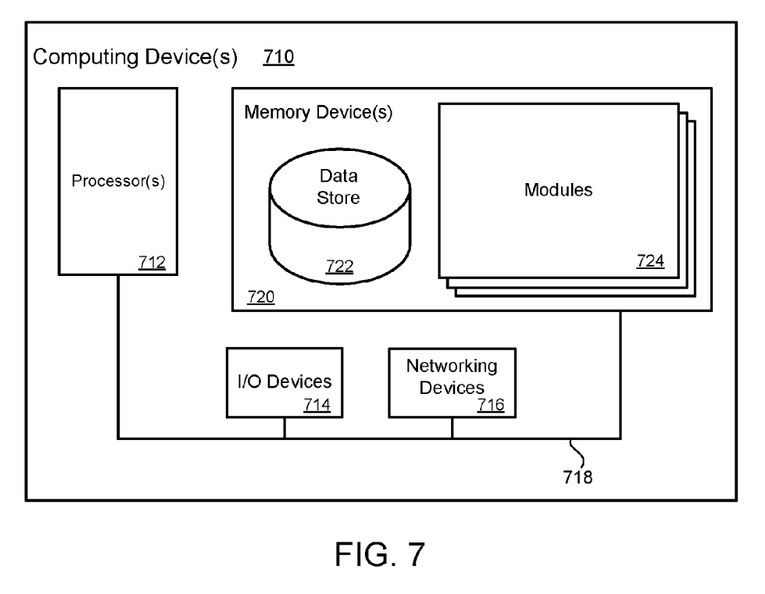
FIG. 7 is block diagram illustrating an example of a computing device that may be used to execute a method for classifying hydrometeors.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device 710 may include a local communication interface 718 for the components in the computing device. For example, the local communication interface 718 may be a local data bus and/or any related address or control busses as may be desired.

The memory device 720 may contain modules 724 that are executable by the processor(s) 712 and data for the modules 724. For example, the memory device 720 may include a motion sensor controller module, a camera activation module, a light source activation module, an environmental measurement module, and a hydrometeor classification module. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. Networking devices 716 and similar communication devices may be included in the computing device. The networking devices 716 may be wired or wireless networking devices that connect to the internet, a LAN, WAN, or other computing network.

The components or modules that are shown as being stored in the memory device 720 may be executed by the processor(s) 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer and similar systems. Furthermore, the memory device can be used to store collected images and data for later processing by a respective processor. The processor can be physically housed within the system, or can be provided by transferring collected data to a separate processor (e.g. desktop or mobile computer).

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer implemented method, comprising:
receiving an image of a hydrometeor captured using a camera included in a hydrometeor classification device;
identifying the hydrometeor in the image, using a hydrometeor classification device processor;
analyzing the hydrometeor represented in the image to determine hydrometeor characteristics associated with the hydrometeor, using the hydrometeor classification device processor;
obtaining environmental measurements from environmental sensors located in proximity to the camera in the hydrometeor classification device and recorded substantially contemporaneously with the image, using the hydrometeor classification device processor;
constructing a feature vector using the hydrometeor characteristics and the environmental measurements, using the hydrometeor classification device processor; and
inputting the feature vector to a classification model used to classify the hydrometeor, using the hydrometeor classification device processor, wherein the classification model outputs a classification for the hydrometeor using the feature vector.

2. A method as in claim 1, wherein identifying the hydrometeor in the image further comprises,
determining a threshold for the image using a thresholding technique;
detecting contours of the hydrometeor in the image using an edge detection technique that uses the threshold for the image; and
identifying the contours of the hydrometeor that are in focus in the image.

3. A method as in claim 2, further comprising determining regions of the image having inter-pixel brightness variability that is greater than the threshold for the image to identify the contours of the hydrometeor that are in focus.

4. A method as in claim 1, wherein characteristics associated with the hydrometeor includes one or more of: hydrometeor shape, hydrometeor size, hydrometeor fall speed, hydrometeor brightness, and hydrometeor internal variability.

5. A method as in claim 1, wherein the environmental measurements obtained from the environmental sensors includes at least one of: environmental temperature, environmental relative humidity, environmental dew point temperature, wind direction, atmospheric pressure, or precipitation accumulation.

6. A method as in claim 1, wherein the feature vector includes at least one of: mean intensity of the hydrometeor, variance of the hydrometeor, inter-pixel brightness variability, perimeter of the hydrometeor, slope of an azimuthally averaged power spectrum of the hydrometeor, fall speed of the hydrometeor, number of separate regions in the image that are in focus, environmental relative humidity, or environmental temperature.

7. A method as in claim 1, wherein the classification model is a machine learning model or fuzzy logic model.

8. A method as in claim 1, wherein classifications output by the classification model includes at least one of: drizzle, rain, freezing rain, freezing drizzle, freezing fog, freezing rain, ice crystals, hail graupel, snow, snow grains, ice pellets, snow pellets, blowing snow, or mixed precipitation.

9. A method as in claim 1, further comprising determining visibility using a contrasting black and white image captured with near-infrared light using the camera.

10. A method as in claim 9, wherein determining visibility further comprises analyzing the contrasting black and white image to determine a presence of fog or haze.

11. A method as in claim 1, wherein receiving the image of the hydrometeor captured using a camera further includes determining a presence of the hydrometeor using motion sensing to determine presence of the hydrometeor located at a predetermined location in order to trigger the camera.

12. A method as in claim 1, wherein the hydrometeor includes at least one of: a snowflake, raindrop, hail, or dust.

13. An apparatus comprising:
a motion sensor controller configured to control a motion sensor and to generate a camera activation signal when the motion sensor senses motion;
a camera activation module in communication with the motion sensor controller, wherein the camera activation module is configured to receive the camera activation signal and activate a camera to capture an image of a hydrometeor;
an environmental measurement module configured to obtain environmental measurements from a plurality of environmental sensors that are located in proximity to the camera and are recorded substantially contemporaneous with the image of the hydrometeor using the camera; and
a hydrometeor classification module configured with instructions that, when executed by a processor, output a classification for the hydrometeor using a classification model, wherein a feature vector constructed using hydrometeor characteristics obtained from the image of the hydrometeor and the environmental measurements obtained from the environmental measurement module is inputted to the classification model.

14. An apparatus as in claim 13, further comprising a light source activation module in communication with the motion sensor controller and the camera activation module, wherein the light source activation module is configured to receive the camera activation signal and in response activate a flashing light source to provide a flash of light in synchronization with image capture by the camera to illuminate the hydrometeor when images of the hydrometeor are captured.

15. An apparatus as in claim 14, wherein the flashing light source that provides the flash of light further comprises, a pair of infrared light emitters and a pair of corresponding infrared light detectors that detect hydrometeors within a field of view of the camera.

16. An apparatus as in claim 14, wherein the flashing light source that provides the flash of light further comprises, a pair of infrared laser diode emitters and a pair of corresponding infrared laser detectors that detect hydrometeors within a field of view of the camera.

17. An apparatus as in claim 14, wherein the light source activation module is further configured to receive the camera activation signal as a result of the hydrometeor passing through a detection region comprising an upper trigger area and a lower trigger area formed using motion sensor arrays, wherein triggering the upper trigger area starts a timer and triggering the lower trigger area stops the timer and causes the camera activation signal to be sent.

18. A system comprising:
a processor;
a memory device including instructions that, when executed by the processor, cause the system to:

receive an image of a hydrometeor within an area defined by motion sensors that is captured using a camera;

identify the hydrometeor in the image;

analyze the hydrometeor represented in the image to determine hydrometeor characteristics associated with the hydrometeor;

obtain environmental measurements from environmental sensors located in proximity to the camera and recorded substantially contemporaneously with the image;

construct a feature vector using the hydrometeor characteristics and the environmental measurements; and input the feature vector to a classification model used to classify the hydrometeor, wherein the classification model outputs a classification for the hydrometeor using the feature vector.

19. A system as in claim 18, wherein the memory device includes instructions that, when executed by the processor, causes the system to calculate a size of the hydrometeor based in part on a distance of the camera to the area defined by the motion sensors.

20. A system as in claim 18, wherein the classification model is a machine learning model or fuzzy logic model.

* * * * *

UNITED STATES PATENT AND TRADEMARK OFFICE
CERTIFICATE OF CORRECTION

Page 1 of 1

PATENT NO. : 10,026,163 B2
APPLICATION NO. : 15/053951
DATED : July 17, 2018
INVENTOR(S) : Cale Fallgatter et al.

It is certified that error appears in the above-identified patent and that said Letters Patent is hereby corrected as shown below:

In the Specification

Column 1 Line 12 delete:
"This invention was made with government support under grant 10034297 awarded by the National Science Foundation (NSF). The government has certain rights in the invention."

And replace it with the following:
--This invention was made with government support under grant 1417234 awarded by the National Science Foundation. The government has certain rights in this invention.--

Signed and Sealed this
Tenth Day of September, 2019

Andrei Iancu
*Director of the United States Patent and Trademark Office*